US009979615B2

(12) United States Patent
Kulshreshtha et al.

(10) Patent No.: US 9,979,615 B2
(45) Date of Patent: May 22, 2018

(54) TECHNIQUES FOR DETERMINING NETWORK TOPOLOGIES

(71) Applicant: Cisco Technology, Inc., San Jose, CA (US)

(72) Inventors: Ashutosh Kulshreshtha, Fremont, CA (US); Hai Trong Vu, San Jose, CA (US); Michael Standish Watts, Mill Valley, CA (US); Jackson Ngoc Ki Pang, Sunnyvale, CA (US); Navindra Yadav, Cupertino, CA (US); Khawar Deen, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 140 days.

(21) Appl. No.: 15/135,331

(22) Filed: Apr. 21, 2016

(65) Prior Publication Data

US 2016/0359677 A1 Dec. 8, 2016

Related U.S. Application Data

(60) Provisional application No. 62/171,899, filed on Jun. 5, 2015.

(51) Int. Cl.
*H04L 12/26* (2006.01)
*H04L 29/06* (2006.01)
(Continued)

(52) U.S. Cl.
CPC .......... *H04L 43/045* (2013.01); *G06F 3/0482* (2013.01); *G06F 3/04842* (2013.01);
(Continued)

(58) Field of Classification Search
CPC ... H04L 12/24; H04L 12/2602; H04L 41/064; H04L 43/00
See application file for complete search history.

(56) References Cited

U.S. PATENT DOCUMENTS

| 5,742,829 A | 4/1998 | Davis et al. |
| 5,903,545 A * | 5/1999 | Sabourin ................ H04L 45/02 370/225 |

(Continued)

FOREIGN PATENT DOCUMENTS

| CN | 101093452 | 12/2007 |
| CN | 101770551 | 7/2010 |

(Continued)

OTHER PUBLICATIONS

InternetPerils, Inc., "Control Your Internet Business Risk," 2003-2015, https://www.internetperils.com/.

(Continued)

*Primary Examiner* — Arvin Eskandarnia
(74) *Attorney, Agent, or Firm* — Polsinelli PC

(57) ABSTRACT

In one embodiment, a monitoring device (or module) monitors messages exchanged between nodes in a communication network. The monitoring device further determines, based on time stamp data associated with each message, one or more latency distributions of paired response times between the nodes, and determines a node topology consistent with each of the one or more latency distributions of paired response times between the nodes. In some embodiments, the monitoring device also generates a graph of the node topology showing one or more communication links between the nodes, and annotates each communication link of the one or more communication links with at least one of a mean response time or a median response time based on at least one of the latency distributions.

20 Claims, 9 Drawing Sheets

(51) Int. Cl.

| | | |
|---|---|---|
| G06F 9/455 | (2018.01) | |
| G06F 17/30 | (2006.01) | |
| H04L 12/851 | (2013.01) | |
| H04L 12/24 | (2006.01) | |
| H04W 84/18 | (2009.01) | |
| H04L 29/08 | (2006.01) | |
| G06N 99/00 | (2010.01) | |
| G06F 21/53 | (2013.01) | |
| H04L 12/723 | (2013.01) | |
| G06F 3/0484 | (2013.01) | |
| H04L 1/24 | (2006.01) | |
| H04W 72/08 | (2009.01) | |
| H04L 9/08 | (2006.01) | |
| H04L 9/32 | (2006.01) | |
| H04J 3/06 | (2006.01) | |
| H04J 3/14 | (2006.01) | |
| H04L 29/12 | (2006.01) | |
| H04L 12/813 | (2013.01) | |
| H04L 12/823 | (2013.01) | |
| H04L 12/801 | (2013.01) | |
| H04L 12/741 | (2013.01) | |
| H04L 12/833 | (2013.01) | |
| H04L 12/721 | (2013.01) | |
| G06F 3/0482 | (2013.01) | |
| G06T 11/20 | (2006.01) | |
| H04L 12/841 | (2013.01) | |
| H04L 12/725 | (2013.01) | |
| H04L 12/715 | (2013.01) | |

(52) U.S. Cl.
CPC ...... *G06F 3/04847* (2013.01); *G06F 9/45558* (2013.01); *G06F 17/3053* (2013.01); *G06F 17/30241* (2013.01); *G06F 17/30554* (2013.01); *G06F 17/30598* (2013.01); *G06F 17/30604* (2013.01); *G06F 17/30867* (2013.01); *G06F 21/53* (2013.01); *G06N 99/005* (2013.01); *G06T 11/206* (2013.01); *H04J 3/0661* (2013.01); *H04J 3/14* (2013.01); *H04L 1/242* (2013.01); *H04L 9/0866* (2013.01); *H04L 9/3239* (2013.01); *H04L 9/3242* (2013.01); *H04L 41/046* (2013.01); *H04L 41/0668* (2013.01); *H04L 41/0803* (2013.01); *H04L 41/0806* (2013.01); *H04L 41/0816* (2013.01); *H04L 41/0893* (2013.01); *H04L 41/12* (2013.01); *H04L 41/16* (2013.01); *H04L 41/22* (2013.01); *H04L 43/02* (2013.01); *H04L 43/04* (2013.01); *H04L 43/062* (2013.01); *H04L 43/08* (2013.01); *H04L 43/0805* (2013.01); *H04L 43/0811* (2013.01); *H04L 43/0829* (2013.01); *H04L 43/0841* (2013.01); *H04L 43/0858* (2013.01); *H04L 43/0864* (2013.01); *H04L 43/0876* (2013.01); *H04L 43/0882* (2013.01); *H04L 43/0888* (2013.01); *H04L 43/10* (2013.01); *H04L 43/106* (2013.01); *H04L 43/12* (2013.01); *H04L 43/16* (2013.01); *H04L 45/306* (2013.01); *H04L 45/38* (2013.01); *H04L 45/46* (2013.01); *H04L 45/507* (2013.01); *H04L 45/66* (2013.01); *H04L 45/74* (2013.01); *H04L 47/11* (2013.01); *H04L 47/20* (2013.01); *H04L 47/2441* (2013.01); *H04L 47/2483* (2013.01); *H04L 47/28* (2013.01); *H04L 47/31* (2013.01); *H04L 47/32* (2013.01); *H04L 61/2007* (2013.01); *H04L 63/0227* (2013.01); *H04L 63/0263* (2013.01); *H04L 63/06* (2013.01); *H04L 63/0876* (2013.01); *H04L 63/145* (2013.01); *H04L 63/1408* (2013.01); *H04L 63/1416* (2013.01); *H04L 63/1425* (2013.01); *H04L 63/1433* (2013.01); *H04L 63/1441* (2013.01); *H04L 63/1458* (2013.01); *H04L 63/1466* (2013.01); *H04L 63/16* (2013.01); *H04L 63/20* (2013.01); *H04L 67/10* (2013.01); *H04L 67/1002* (2013.01); *H04L 67/12* (2013.01); *H04L 67/16* (2013.01); *H04L 67/36* (2013.01); *H04L 67/42* (2013.01); *H04L 69/16* (2013.01); *H04L 69/22* (2013.01); *H04W 72/08* (2013.01); *H04W 84/18* (2013.01); *G06F 2009/4557* (2013.01); *G06F 2009/45587* (2013.01); *G06F 2009/45591* (2013.01); *G06F 2009/45595* (2013.01); *H04L 67/22* (2013.01)

(56) References Cited

U.S. PATENT DOCUMENTS

| | | |
|---|---|---|
| 6,012,096 A | 1/2000 | Link et al. |
| 6,144,962 A | 11/2000 | Weinberg et al. |
| 6,247,058 B1 | 6/2001 | Miller et al. |
| 6,330,562 B1 | 12/2001 | Boden et al. |
| 6,525,658 B2 | 2/2003 | Streetman et al. |
| 6,597,663 B1* | 7/2003 | Rekhter .......... H04L 45/02 370/238 |
| 6,611,896 B1 | 8/2003 | Mason, Jr. et al. |
| 6,728,779 B1* | 4/2004 | Griffin .......... H04L 45/02 370/469 |
| 6,801,878 B1 | 10/2004 | Hintz et al. |
| 6,847,993 B1 | 1/2005 | Novaes et al. |
| 6,925,490 B1 | 8/2005 | Novaes et al. |
| 6,958,998 B2 | 10/2005 | Shorey |
| 6,983,323 B2 | 1/2006 | Cantrell et al. |
| 6,996,817 B2 | 2/2006 | Birum et al. |
| 7,002,464 B2 | 2/2006 | Bruemmer et al. |
| 7,120,934 B2 | 10/2006 | Ishikawa |
| 7,181,769 B1 | 2/2007 | Keanini et al. |
| 7,185,103 B1 | 2/2007 | Jain |
| 7,337,206 B1 | 2/2008 | Wen et al. |
| 7,353,511 B1 | 4/2008 | Ziese |
| 7,370,092 B2 | 5/2008 | Aderton et al. |
| 7,395,195 B2 | 7/2008 | Suenbuel et al. |
| 7,444,404 B2 | 10/2008 | Wetherall et al. |
| 7,466,681 B2 | 12/2008 | Ashwood-Smith et al. |
| 7,467,205 B1 | 12/2008 | Dempster et al. |
| 7,496,040 B2 | 2/2009 | Seo |
| 7,496,575 B2 | 2/2009 | Buccella et al. |
| 7,530,105 B2 | 5/2009 | Gilbert et al. |
| 7,610,330 B1 | 10/2009 | Quinn et al. |
| 7,633,942 B2 | 12/2009 | Bearden et al. |
| 7,676,570 B2 | 3/2010 | Levy et al. |
| 7,681,131 B1 | 3/2010 | Quarterman et al. |
| 7,693,947 B2 | 4/2010 | Judge et al. |
| 7,752,307 B2 | 7/2010 | Takara |
| 7,783,457 B2 | 8/2010 | Cunningham |
| 7,844,696 B2* | 11/2010 | Labovitz .......... H04L 41/0618 370/254 |
| 7,844,744 B2 | 11/2010 | Abercrombie et al. |
| 7,864,707 B2 | 1/2011 | Dimitropoulos et al. |
| 7,873,025 B2 | 1/2011 | Patel et al. |
| 7,874,001 B2 | 1/2011 | Beck et al. |
| 7,885,197 B2 | 2/2011 | Metzler |
| 7,895,649 B1 | 2/2011 | Brook et al. |
| 7,904,420 B2 | 3/2011 | Ianni |
| 7,930,752 B2 | 4/2011 | Hertzog et al. |
| 7,934,248 B1 | 4/2011 | Yehuda et al. |
| 7,957,934 B2 | 6/2011 | Greifeneder |
| 7,961,637 B2 | 6/2011 | McBeath |
| 7,970,946 B1 | 6/2011 | Djabarov et al. |
| 7,975,035 B2 | 7/2011 | Popescu et al. |
| 8,005,935 B2 | 8/2011 | Pradhan et al. |
| 8,040,232 B2 | 10/2011 | Oh et al. |

(56) References Cited

U.S. PATENT DOCUMENTS

| | | |
|---|---|---|
| 8,040,822 B2 | 10/2011 | Proulx et al. |
| 8,135,657 B2 | 3/2012 | Kapoor et al. |
| 8,156,430 B2 | 4/2012 | Newman |
| 8,185,824 B1 | 5/2012 | Mitchell et al. |
| 8,250,657 B1 | 8/2012 | Nachenberg et al. |
| 8,255,972 B2 | 8/2012 | Azagury et al. |
| 8,266,697 B2 | 9/2012 | Coffman |
| 8,281,397 B2 | 10/2012 | Vaidyanathan et al. |
| 8,291,495 B1 | 10/2012 | Burns et al. |
| 8,296,847 B2 | 10/2012 | Mendonca et al. |
| 8,370,407 B1 | 2/2013 | Devarajan et al. |
| 8,381,289 B1 | 2/2013 | Pereira et al. |
| 8,391,270 B2 | 3/2013 | Van Der Stok et al. |
| 8,407,164 B2 | 3/2013 | Malik et al. |
| 8,442,073 B2 | 5/2013 | Skubacz et al. |
| 8,451,731 B1 | 5/2013 | Lee et al. |
| 8,462,212 B1 | 6/2013 | Kundu et al. |
| 8,489,765 B2 | 7/2013 | Vasseur et al. |
| 8,516,590 B1 | 8/2013 | Ranadive et al. |
| 8,527,977 B1 | 9/2013 | Cheng et al. |
| 8,570,861 B1 | 10/2013 | Brandwine et al. |
| 8,572,600 B2 | 10/2013 | Chung et al. |
| 8,572,734 B2 | 10/2013 | McConnell et al. |
| 8,572,735 B2 | 10/2013 | Ghosh et al. |
| 8,588,081 B2 | 11/2013 | Salam et al. |
| 8,600,726 B1 | 12/2013 | Varshney et al. |
| 8,630,316 B2 | 1/2014 | Haba |
| 8,640,086 B2 | 1/2014 | Bonev et al. |
| 8,661,544 B2 | 2/2014 | Yen et al. |
| 8,677,487 B2 | 3/2014 | Balupari et al. |
| 8,683,389 B1 | 3/2014 | Bar-Yam et al. |
| 8,706,914 B2 | 4/2014 | Duchesneau |
| 8,719,452 B1 | 5/2014 | Ding et al. |
| 8,719,835 B2 | 5/2014 | Kanso et al. |
| 8,752,042 B2 | 6/2014 | Ratica |
| 8,755,396 B2 | 6/2014 | Sindhu et al. |
| 8,762,951 B1 | 6/2014 | Kosche et al. |
| 8,769,084 B2 | 7/2014 | Westerfeld et al. |
| 8,776,180 B2 | 7/2014 | Kumar et al. |
| 8,812,725 B2 | 8/2014 | Kulkarni |
| 8,813,236 B1 | 8/2014 | Saha et al. |
| 8,825,848 B1 | 9/2014 | Dotan et al. |
| 8,832,013 B1 | 9/2014 | Adams et al. |
| 8,832,461 B2 | 9/2014 | Saroiu et al. |
| 8,849,926 B2 | 9/2014 | Marzencki et al. |
| 8,881,258 B2 | 11/2014 | Paul et al. |
| 8,887,238 B2 | 11/2014 | Howard et al. |
| 8,904,520 B1 | 12/2014 | Nachenberg et al. |
| 8,931,043 B2 | 1/2015 | Cooper et al. |
| 8,954,610 B2 | 2/2015 | Berke et al. |
| 8,973,147 B2 | 3/2015 | Pearcy et al. |
| 8,990,386 B2 | 3/2015 | He et al. |
| 8,996,695 B2 | 3/2015 | Anderson et al. |
| 8,997,227 B1 | 3/2015 | Mhatre et al. |
| 9,015,716 B2 | 4/2015 | Fletcher et al. |
| 9,071,575 B2 | 6/2015 | Lemaster et al. |
| 9,088,598 B1 | 7/2015 | Zhang et al. |
| 9,110,905 B2 | 8/2015 | Polley et al. |
| 9,160,764 B2 | 10/2015 | Stiansen et al. |
| 9,178,906 B1 | 11/2015 | Chen et al. |
| 9,197,654 B2 | 11/2015 | Ben-Shalom et al. |
| 9,225,793 B2 | 12/2015 | Dutta et al. |
| 9,237,111 B2 | 1/2016 | Banavalikar et al. |
| 9,246,773 B2 | 1/2016 | Degioanni |
| 9,258,217 B2 | 2/2016 | Duffield et al. |
| 9,281,940 B2 | 3/2016 | Matsuda et al. |
| 9,317,574 B1 | 4/2016 | Brisebois et al. |
| 9,319,384 B2 | 4/2016 | Yan et al. |
| 9,405,903 B1 | 8/2016 | Xie et al. |
| 9,418,222 B1 | 8/2016 | Rivera et al. |
| 9,454,324 B1 | 9/2016 | Madhavapeddi |
| 9,501,744 B1 | 11/2016 | Brisebois et al. |
| 9,634,915 B2 | 4/2017 | Bley |
| 9,645,892 B1 | 5/2017 | Patwardhan |
| 9,733,973 B2 | 8/2017 | Prasad et al. |
| 2002/0053033 A1 | 5/2002 | Cooper et al. |
| 2002/0103793 A1 | 8/2002 | Koller et al. |
| 2002/0141343 A1* | 10/2002 | Bays .................. H04L 41/0893 370/235 |
| 2002/0184393 A1* | 12/2002 | Leddy .................. H04L 43/00 709/250 |
| 2003/0097439 A1 | 5/2003 | Strayer et al. |
| 2003/0145232 A1 | 7/2003 | Poletto et al. |
| 2003/0154399 A1 | 8/2003 | Zuk et al. |
| 2004/0030776 A1 | 2/2004 | Cantrell et al. |
| 2004/0268149 A1 | 12/2004 | Aaron |
| 2005/0039104 A1 | 2/2005 | Shah et al. |
| 2005/0166066 A1 | 7/2005 | Ahuja et al. |
| 2005/0207376 A1 | 9/2005 | Ashwood-Smith et al. |
| 2005/0257244 A1 | 11/2005 | Joly et al. |
| 2005/0289244 A1 | 12/2005 | Sahu et al. |
| 2006/0048218 A1 | 3/2006 | Lingafelt et al. |
| 2006/0080733 A1 | 4/2006 | Khosmood et al. |
| 2006/0095968 A1 | 5/2006 | Portolani et al. |
| 2006/0156408 A1 | 7/2006 | Himberger et al. |
| 2006/0195448 A1 | 8/2006 | Newport |
| 2006/0272018 A1 | 11/2006 | Fouant |
| 2006/0274659 A1 | 12/2006 | Ouderkirk |
| 2006/0294219 A1 | 12/2006 | Ogawa et al. |
| 2007/0044147 A1 | 2/2007 | Choi et al. |
| 2007/0097976 A1 | 5/2007 | Wood et al. |
| 2007/0169179 A1 | 7/2007 | Narad |
| 2007/0195729 A1 | 8/2007 | Li et al. |
| 2007/0195797 A1 | 8/2007 | Patel et al. |
| 2007/0211637 A1 | 9/2007 | Mitchell |
| 2007/0300061 A1 | 12/2007 | Kim et al. |
| 2008/0022385 A1 | 1/2008 | Crowell et al. |
| 2008/0082662 A1 | 4/2008 | Danliker et al. |
| 2008/0101234 A1 | 5/2008 | Nakil et al. |
| 2008/0126534 A1 | 5/2008 | Mueller et al. |
| 2008/0250122 A1 | 10/2008 | Zsigmond et al. |
| 2008/0270199 A1 | 10/2008 | Chess et al. |
| 2008/0301765 A1 | 12/2008 | Nicol et al. |
| 2009/0064332 A1 | 3/2009 | Porras et al. |
| 2009/0241170 A1 | 9/2009 | Kumar et al. |
| 2009/0307753 A1 | 12/2009 | Dupont et al. |
| 2009/0313373 A1 | 12/2009 | Hanna et al. |
| 2009/0313698 A1 | 12/2009 | Wahl |
| 2009/0328219 A1 | 12/2009 | Narayanaswamy |
| 2010/0005288 A1 | 1/2010 | Rao et al. |
| 2010/0077445 A1 | 3/2010 | Schneider et al. |
| 2010/0095293 A1 | 4/2010 | O'Neill et al. |
| 2010/0095367 A1 | 4/2010 | Narayanaswamy |
| 2010/0138810 A1 | 6/2010 | Komatsu et al. |
| 2010/0148940 A1 | 6/2010 | Gelvin et al. |
| 2010/0153316 A1 | 6/2010 | Duffield et al. |
| 2010/0153696 A1 | 6/2010 | Beachem et al. |
| 2010/0220584 A1 | 9/2010 | DeHaan et al. |
| 2010/0235514 A1 | 9/2010 | Beachem |
| 2010/0235915 A1 | 9/2010 | Memon et al. |
| 2010/0303240 A1 | 12/2010 | Beachem |
| 2010/0319060 A1 | 12/2010 | Aiken et al. |
| 2011/0010585 A1 | 1/2011 | Bugenhagen et al. |
| 2011/0055381 A1 | 3/2011 | Narasimhan et al. |
| 2011/0055388 A1 | 3/2011 | Yumerefendi et al. |
| 2011/0066719 A1 | 3/2011 | Miryanov et al. |
| 2011/0069685 A1 | 3/2011 | Tofighbakhsh |
| 2011/0083125 A1 | 4/2011 | Komatsu et al. |
| 2011/0126275 A1 | 5/2011 | Anderson et al. |
| 2011/0145885 A1 | 6/2011 | Rivers et al. |
| 2011/0170860 A1* | 7/2011 | Smith .................. H04J 3/0682 398/25 |
| 2011/0173490 A1 | 7/2011 | Narayanaswamy et al. |
| 2011/0185423 A1 | 7/2011 | Sallam |
| 2011/0196957 A1 | 8/2011 | Ayachitula et al. |
| 2011/0202655 A1 | 8/2011 | Sharma et al. |
| 2011/0225207 A1 | 9/2011 | Subramanian et al. |
| 2011/0228696 A1 | 9/2011 | Agarwal et al. |
| 2011/0302652 A1 | 12/2011 | Westerfeld |
| 2011/0314148 A1 | 12/2011 | Petersen et al. |
| 2012/0005542 A1 | 1/2012 | Petersen et al. |
| 2012/0079592 A1 | 3/2012 | Pandrangi |
| 2012/0102361 A1 | 4/2012 | Sass et al. |
| 2012/0102543 A1 | 4/2012 | Kohli et al. |

(56) References Cited

U.S. PATENT DOCUMENTS

| | | |
|---|---|---|
| 2012/0117226 A1 | 5/2012 | Tanaka et al. |
| 2012/0136996 A1 | 5/2012 | Seo et al. |
| 2012/0137278 A1 | 5/2012 | Draper et al. |
| 2012/0140626 A1 | 6/2012 | Anand et al. |
| 2012/0197856 A1 | 8/2012 | Banka et al. |
| 2012/0198541 A1 | 8/2012 | Reeves |
| 2012/0216271 A1 | 8/2012 | Cooper et al. |
| 2012/0233473 A1 | 9/2012 | Vasseur et al. |
| 2012/0240232 A1 | 9/2012 | Azuma |
| 2012/0246303 A1 | 9/2012 | Petersen et al. |
| 2012/0278021 A1 | 11/2012 | Lin et al. |
| 2013/0003538 A1 | 1/2013 | Greenburg et al. |
| 2013/0006935 A1 | 1/2013 | Grisby |
| 2013/0038358 A1 | 2/2013 | Cook et al. |
| 2013/0086272 A1 | 4/2013 | Chen et al. |
| 2013/0103827 A1 | 4/2013 | Dunlap et al. |
| 2013/0145099 A1 | 6/2013 | Liu et al. |
| 2013/0159999 A1 | 6/2013 | Chiueh et al. |
| 2013/0179487 A1 | 7/2013 | Lubetzky et al. |
| 2013/0179879 A1 | 7/2013 | Zhang et al. |
| 2013/0198839 A1 | 8/2013 | Wei et al. |
| 2013/0246925 A1 | 9/2013 | Ahuja et al. |
| 2013/0247201 A1 | 9/2013 | Alperovitch et al. |
| 2013/0254879 A1 | 9/2013 | Chesla et al. |
| 2013/0268994 A1 | 10/2013 | Cooper et al. |
| 2013/0275579 A1 | 10/2013 | Hernandez et al. |
| 2013/0283374 A1 | 10/2013 | Zisapel et al. |
| 2013/0290521 A1 | 10/2013 | Labovitz |
| 2013/0297771 A1 | 11/2013 | Osterloh et al. |
| 2013/0304900 A1 | 11/2013 | Trabelsi et al. |
| 2013/0305369 A1 | 11/2013 | Karta et al. |
| 2013/0318357 A1 | 11/2013 | Abraham et al. |
| 2013/0326623 A1 | 12/2013 | Kruglick |
| 2013/0333029 A1 | 12/2013 | Chesla et al. |
| 2013/0347103 A1 | 12/2013 | Veteikis et al. |
| 2014/0006610 A1 | 1/2014 | Formby et al. |
| 2014/0006871 A1 | 1/2014 | Lakshmanan et al. |
| 2014/0012814 A1 | 1/2014 | Bercovici et al. |
| 2014/0033193 A1 | 1/2014 | Palaniappan |
| 2014/0047185 A1 | 2/2014 | Peterson et al. |
| 2014/0047372 A1 | 2/2014 | Gnezdov et al. |
| 2014/0059200 A1 | 2/2014 | Nguyen et al. |
| 2014/0089494 A1 | 3/2014 | Dasari et al. |
| 2014/0096058 A1 | 4/2014 | Molesky et al. |
| 2014/0115219 A1 | 4/2014 | Ajanovic et al. |
| 2014/0143825 A1 | 5/2014 | Behrendt et al. |
| 2014/0149490 A1 | 5/2014 | Luxenberg et al. |
| 2014/0156814 A1 | 6/2014 | Barabash et al. |
| 2014/0164607 A1 | 6/2014 | Bai et al. |
| 2014/0173623 A1 | 6/2014 | Chang et al. |
| 2014/0192639 A1 | 7/2014 | Smirnov |
| 2014/0201717 A1 | 7/2014 | Mascaro et al. |
| 2014/0215573 A1 | 7/2014 | Cepuran |
| 2014/0215621 A1 | 7/2014 | Xaypanya et al. |
| 2014/0281030 A1 | 9/2014 | Cui et al. |
| 2014/0289854 A1 | 9/2014 | Mahvi |
| 2014/0298461 A1 | 10/2014 | Hohndel et al. |
| 2014/0317737 A1 | 10/2014 | Shin et al. |
| 2014/0331276 A1 | 11/2014 | Frascadore et al. |
| 2014/0331280 A1 | 11/2014 | Porras et al. |
| 2014/0331304 A1 | 11/2014 | Wong |
| 2014/0351203 A1 | 11/2014 | Kunnatur et al. |
| 2014/0351415 A1 | 11/2014 | Harrigan et al. |
| 2014/0359695 A1 | 12/2014 | Chari et al. |
| 2015/0009840 A1 | 1/2015 | Pruthi et al. |
| 2015/0033305 A1 | 1/2015 | Shear et al. |
| 2015/0036533 A1 | 2/2015 | Sodhi et al. |
| 2015/0039751 A1 | 2/2015 | Harrigan et al. |
| 2015/0046882 A1 | 2/2015 | Menyhart et al. |
| 2015/0058976 A1 | 2/2015 | Carney et al. |
| 2015/0067143 A1 | 3/2015 | Babakhan et al. |
| 2015/0082151 A1 | 3/2015 | Liang et al. |
| 2015/0085665 A1 | 3/2015 | Kompella et al. |
| 2015/0095332 A1 | 4/2015 | Beisiegel et al. |
| 2015/0112933 A1 | 4/2015 | Satapathy |
| 2015/0113133 A1 | 4/2015 | Srinivas et al. |
| 2015/0124608 A1 | 5/2015 | Agarwal et al. |
| 2015/0138993 A1 | 5/2015 | Forster et al. |
| 2015/0142962 A1 | 5/2015 | Srinivas et al. |
| 2015/0195291 A1 | 7/2015 | Zuk et al. |
| 2015/0249622 A1 | 9/2015 | Phillips et al. |
| 2015/0256555 A1 | 9/2015 | Choi et al. |
| 2015/0261842 A1 | 9/2015 | Huang et al. |
| 2015/0261886 A1 | 9/2015 | Wu et al. |
| 2015/0271255 A1 | 9/2015 | Mackay et al. |
| 2015/0295945 A1 | 10/2015 | Canzanese, Jr. et al. |
| 2015/0347554 A1 | 12/2015 | Vasantham et al. |
| 2015/0358352 A1 | 12/2015 | Chasin et al. |
| 2016/0006753 A1 | 1/2016 | McDaid et al. |
| 2016/0021131 A1 | 1/2016 | Heilig |
| 2016/0026552 A1* | 1/2016 | Holden ............... G06F 8/65 709/224 |
| 2016/0036837 A1 | 2/2016 | Jain et al. |
| 2016/0050132 A1 | 2/2016 | Zhang et al. |
| 2016/0072815 A1 | 3/2016 | Rieke et al. |
| 2016/0103692 A1 | 4/2016 | Guntaka et al. |
| 2016/0105350 A1 | 4/2016 | Greifeneder et al. |
| 2016/0119234 A1 | 4/2016 | Valencia Lopez et al. |
| 2016/0127395 A1 | 5/2016 | Underwood et al. |
| 2016/0147585 A1 | 5/2016 | Konig et al. |
| 2016/0162308 A1 | 6/2016 | Chen et al. |
| 2016/0162312 A1 | 6/2016 | Doherty et al. |
| 2016/0205002 A1 | 7/2016 | Rieke et al. |
| 2016/0216994 A1 | 7/2016 | Sefidcon et al. |
| 2016/0294691 A1 | 10/2016 | Joshi |
| 2016/0308908 A1 | 10/2016 | Kirby et al. |
| 2016/0357424 A1 | 12/2016 | Pang et al. |
| 2016/0357546 A1 | 12/2016 | Chang et al. |
| 2016/0357587 A1 | 12/2016 | Yadav et al. |
| 2016/0357957 A1 | 12/2016 | Deen et al. |
| 2016/0359592 A1 | 12/2016 | Kulshreshtha et al. |
| 2016/0359628 A1 | 12/2016 | Singh et al. |
| 2016/0359658 A1 | 12/2016 | Yadav et al. |
| 2016/0359673 A1 | 12/2016 | Gupta et al. |
| 2016/0359678 A1 | 12/2016 | Madani et al. |
| 2016/0359679 A1 | 12/2016 | Parasdehgheibi et al. |
| 2016/0359680 A1 | 12/2016 | Parandehgheibi et al. |
| 2016/0359686 A1 | 12/2016 | Parandehgheibi et al. |
| 2016/0359696 A1 | 12/2016 | Yadav et al. |
| 2016/0359697 A1 | 12/2016 | Scheib et al. |
| 2016/0359698 A1 | 12/2016 | Deen et al. |
| 2016/0359699 A1 | 12/2016 | Gandham et al. |
| 2016/0359700 A1 | 12/2016 | Pang et al. |
| 2016/0359701 A1 | 12/2016 | Pang et al. |
| 2016/0359703 A1 | 12/2016 | Gandham et al. |
| 2016/0359704 A1 | 12/2016 | Gandham et al. |
| 2016/0359705 A1 | 12/2016 | Parasdehgheibi et al. |
| 2016/0359708 A1 | 12/2016 | Gandham et al. |
| 2016/0359709 A1 | 12/2016 | Deen et al. |
| 2016/0359711 A1 | 12/2016 | Deen et al. |
| 2016/0359712 A1 | 12/2016 | Alizadeh Attar et al. |
| 2016/0359740 A1 | 12/2016 | Parandehgheibi et al. |
| 2016/0359759 A1 | 12/2016 | Singh et al. |
| 2016/0359872 A1 | 12/2016 | Yadav et al. |
| 2016/0359877 A1 | 12/2016 | Kulshreshtha et al. |
| 2016/0359878 A1 | 12/2016 | Prasad et al. |
| 2016/0359879 A1 | 12/2016 | Deen et al. |
| 2016/0359880 A1 | 12/2016 | Pang et al. |
| 2016/0359881 A1 | 12/2016 | Yadav et al. |
| 2016/0359888 A1 | 12/2016 | Gupta et al. |
| 2016/0359889 A1 | 12/2016 | Yadav et al. |
| 2016/0359890 A1 | 12/2016 | Deen et al. |
| 2016/0359891 A1 | 12/2016 | Pang et al. |
| 2016/0359897 A1 | 12/2016 | Yadav et al. |
| 2016/0359912 A1 | 12/2016 | Gupta et al. |
| 2016/0359913 A1 | 12/2016 | Gupta et al. |
| 2016/0359914 A1 | 12/2016 | Deen et al. |
| 2016/0359915 A1 | 12/2016 | Gupta et al. |
| 2016/0359917 A1 | 12/2016 | Rao et al. |
| 2016/0373481 A1 | 12/2016 | Sultan et al. |

(56) References Cited

U.S. PATENT DOCUMENTS

2017/0034018 A1 2/2017 Parasdehgheibi et al.
2018/0006911 A1 1/2018 Dickey

FOREIGN PATENT DOCUMENTS

| | | |
|---|---|---|
| CN | 102521537 | 6/2012 |
| CN | 103023970 | 4/2013 |
| CN | 103716137 | 4/2014 |
| CN | 104065518 | 9/2014 |
| EP | 0811942 | 12/1997 |
| EP | 1383261 | 1/2004 |
| EP | 1450511 | 8/2004 |
| EP | 2045974 | 4/2008 |
| EP | 2887595 | 6/2015 |
| JP | 2009-016906 | 1/2009 |
| KR | 1394338 | 5/2014 |
| WO | WO 2007/014314 | 2/2007 |
| WO | WO 2007/070711 | 6/2007 |
| WO | WO 2008/069439 | 6/2008 |
| WO | WO 2013/030830 | 3/2013 |
| WO | WO 2015/042171 | 3/2015 |
| WO | WO 2016/004075 | 1/2016 |
| WO | WO 2016/019523 | 2/2016 |

OTHER PUBLICATIONS

Bosch, Greg, "Virtualization," 2010, 33 pages.
Breen, Christopher, "MAC 911, How to dismiss Mac App Store Notifications," Macworld.com, Mar. 24, 2014, 3 pages.
Chou, C.W., et al., "Optical Clocks and Relativity," Science vol. 329, Sep. 24, 2010, pp. 1630-1633.
Huang, Hing-Jie, et al., "Clock Skew Based Node Identification in Wireless Sensor Networks," IEEE, 2008, 5 pages.
Ives, Herbert, E., et al., "An Experimental Study of the Rate of a Moving Atomic Clock," Journal of the Optical Society of America, vol. 28, No. 7, Jul. 1938, pp. 215-226.
Witze, Alexandra, "Special relativity aces time trial, 'Time dilation' predicted by Einstein confirmed by lithium ion experiment," Nature, Sep. 19, 2014, 3 pages.
Zatrochova, Zuzana, "Analysis and Testing of Distributed NoSQL Datastore Riak," Spring, 2015, 76 pages.
Australian Government Department of Defence, Intelligence and Security, "Top 4 Strategies to Mitigate Targeted Cyber Intrusions," Cyber Security Operations Centre Jul. 2013, http://www.asd.gov.au/infosec/top-mitigations/top-4-strategies-explained.htm.
Author Unknown, "Blacklists & Dynamic Reputation: Understanding Why the Evolving Threat Eludes Blacklists," www.dambaia.com, 9 pages, Dambala, Atlanta, GA, USA.
Aydin, Galip, et al., "Architecture and Implementation of a Scalable Sensor Data Storage and Analysis Using Cloud Computing and Big Data Technologies," Journal of Sensors, vol. 2015, Article ID 834217, Feb. 2015, 11 pages.
Backes, Michael, et al., "Data Lineage in Malicious Environments," IEEE 2015, pp. 1-13.
Bayati, Mohsen, et al., "Message-Passing Algorithms for Sparse Network Alignment," Mar. 2013, 31 pages.
Berezinski, Przemyslaw, et al., "An Entropy-Based Network Anomaly Detection Method," Entropy, 2015, vol. 17, www.mdpi.com/journal/entropy, pp. 2367-2408.
Berthier, Robin, et al. "Nfsight: Netflow-based Network Awareness Tool," 2010, 16 pages.
Bhuyan, Dhiraj, "Fighting Bots and Botnets," 2006, pp. 23-28.
Blair, Dana, et al., U.S. Appl. No. 62/106,006, tiled Jan. 21, 2015, entitled "Monitoring Network Policy Compliance."
Chandran, Midhun, et al., "Monitoring in a Virtualized Environment," GSTF International Journal on Computing, vol. 1, No. 1, Aug. 2010.
Chari, Suresh, et al., "Ensuring continuous compliance through reconciling policy with usage," Proceedings of the 18$^{th}$ ACM symposium on Access control models and technologies (SACMAT '13). ACM, New York, NY, USA, 49-60.
Chen, Xu, et al., "Automating network application dependency discovery: experiences, limitations, and new solutions," 8th USENIX conference on Operating systems design and implementation (OSDI'08), USENIX Association, Berkeley, CA, USA, 117-130.
Cisco Systems, "Cisco Network Analysis Modules (NAM) Tutorial," Cisco Systems, Inc., Version 3.5.
Cisco Systems, Inc., "Addressing Compliance from One Infrastructure: Cisco Unified Compliance Solution Framework," 2014.
Cisco Systems, Inc., "Cisco Application Dependency Mapping Service," 2009.
Cisco Systems, Inc., "White Paper—New Cisco Technologies Help Customers Achieve Regulatory Compliance," 1992-2008.
Cisco Systems, Inc., "A Cisco Guide to Defending Against Distributed Denial of Service Attacks," May 3, 2016, 34 pages.
Cisco Technology, Inc., "Cisco Lock-and-Key:Dynamic Access Lists," http://www/cisco.com/c/en/us/support/docs/security-vpn/lock-key/7604-13.html; Updated Jul. 12, 2006, 16 pages.
Di Lorenzo, Guisy, et al., "EXSED: An Intelligent Tool for Exploration of Social Events Dynamics from Augmented Trajectories," Mobile Data Management (MDM), pp. 323-330, Jun. 3-6, 2013.
Feinstein, Laura, et al., "Statistical Approaches to DDoS Attack Detection and Response," Proceedings of the DARPA Information Survivability Conference and Exposition (DISCEX '03), Apr. 2003, 12 pages.
George, Ashley, et al., "NetPal: A Dynamic Network Administration Knowledge Base," 2008, pp. 1-14.
Goldsteen, Abigail, et al., "A Tool for Monitoring and Maintaining System Trustworthiness at Run Time," REFSQ (2015), pp. 142-147.
Hamadi, S., et al., "Fast Path Acceleration for Open vSwitch in Overlay Networks," Global Information Infrastructure and Networking Symposium (GIIS), Montreal, QC, pp. 1-5, Sep. 15-19, 2014.
Hewlett-Packard, "Effective use of reputation intelligence in a security operations center," Jul. 2013, 6 pages.
Hideshima, Yusuke, et al., "STARMINE: A Visualization System for Cyber Attacks," http://www.researchgate.net/publication/221536306, Feb. 2006, 9 pages.
Janoff, Christian, et al., "Cisco Compliance Solution for HIPAA Security Rule Design and Implementation Guide," Cisco Systems, Inc., Updated Nov. 14, 2015, part 1 of 2, 350 pages.
Janoff, Christian, et al., "Cisco Compliance Solution for HIPAA Security Rule Design and Implementation Guide," Cisco Systems, Inc., Updated Nov. 14, 2015, part 2 of 2, 588 pages.
Kerrison, Adam, et al., "Four Steps to Faster, Better Application Dependency Mapping—Laying the Foundation for Effective Business Service Models," BMCSoftware, 2011.
Kraemer, Brian, "Get to know your data center with CMDB," TechTarget, Apr. 5, 2006, http://searchdatacenter.techtarget.com/news/118820/Get-to-know-your-data-center-with-CMDB.
Lab SKU, "VMware Hands-on Labs—HOL-SDC-1301" Version: 20140321-160709, 2013; http://docs.hol.vmware.com/HOL-2013/holsdc-1301_html_en/ (part 1 of 2).
Lab SKU, "VMware Hands-on Labs—HOL-SDC-1301" Version: 20140321-160709, 2013; http://docs.hol.vmware.com/HOL-2013/holsdc-1301_html_en/ (part 2 of 2).
Lachance, Michael, "Dirty Little Secrets of Application Dependency Mapping," Dec. 26, 2007.
Landman, Yoav, et al., "Dependency Analyzer," Feb. 14, 2008, http://frog.com/confluence/display/DA/Home.
Lee, Sihyung, "Reducing Complexity of Large-Scale Network Configuration Management," Ph.D. Dissertation, Carniege Mellon University, 2010.
Li, Ang, et al., "Fast Anomaly Detection for Large Data Centers," Global Telecommunications Conference (GLOBECOM 2010, Dec. 2010, 6 pages.
Li, Bingbong, et al, "A Supervised Machine Learning Approach to Classify Host Roles on Line Using sFlow," in Proceedings of the first edition workshop on High performance and programmable networking, 2013, ACM, New York, NY, USA, 53-60.

(56) References Cited

OTHER PUBLICATIONS

Liu, Ting, et al., "Impala: A Middleware System for Managing Autonomic, Parallel Sensor Systems," In Proceedings of the Ninth ACM SIGPLAN Symposium on Principles and Practice of Parallel Programming(PPoPP '03), ACM, New York, NY, USA, Jun. 11-13, 2003, pp. 107-118.
Lu, Zhonghai, et al., "Cluster-based Simulated Annealing for Mapping Cores onto 2D Mesh Networks on Chip," Design and Diagnostics of Electronic Circuits and Systems, pp. 1, 6, 16-18, Apr. 2008.
Matteson, Ryan, "Depmap: Dependency Mapping of Applications Using Operating System Events: a Thesis," Master's Thesis, California Polytechnic State University, Dec. 2010.
Natarajan, Arun, et al., "NSDMiner: Automated Discovery of Network Service Dependencies," Institute of Electrical and Electronics Engineers INFOCOM, Feb. 2012, 9 pages.
Navaz, A.S. Syed, et al., "Entropy based Anomaly Detection System to Prevent DDoS Attacks in Cloud," International Journal of computer Applications (0975-8887), vol. 62, No. 15, Jan. 2013, pp. 42-47.
Neverfail, "Neverfail IT Continuity Architect," 2015, https://web.archive.org/web/20150908090456/http://www.neverfallgroup.com/products/it-continuity-architect.
Nilsson, Dennis K., et al., "Key Management and Secure Software Updates in Wireless Process Control Environments," In Proceedings of the First ACM Conference on Wireless Network Security (WiSec '08), ACM, New York, NY, USA, Mar. 31-Apr. 2, 2008, pp. 100-108.
Nunnally, Troy, et al., "P3D: A Parallel 3D Coordinate Visualization for Advanced Network Scans," IEEE 2013, Jun. 9-13, 2013, 6 pages.
O'Donnell, Glenn, et al., "The CMDB Imperative: How to Realize the Dream and Avoid the Nightmares," Prentice Hall, Feb. 19, 2009.
Ohta, Kohei, et al., "Detection, Defense, and Tracking of Internet-Wide Illegal Access in a Distributed Manner," 2000, pp. 1-16.
Pathway Systems International Inc., "How Blueprints does Integration," Apr. 15, 2014, 9 pages, http://pathwaysystems.com/company.blog/.
Pathway Systems International Inc., "What is Blueprints?" 2010-2016, http://pathwaysystems.com/blueprints-about/.
Popa, Lucian, et al., "Macroscope: End-Point Approach to Networked Application Dependency Discovery," CoNEXT'09, Dec. 1-4, 2009, Rome, Italy, 12 pages.
Prasad, K. Munivara, et al., "An Efficient Detection of Flooding Attacks to Internet Threat Monitors (ITM) using Entropy Variations under Low Traffic," Computing Communication & Networking Technologies (ICCCNT '12), Jul. 26-28, 2012, 11 pages.
Sachan, Mrinmaya, et al., "Solving Electrical Networks to incorporate Supervision in Random Walks," May 13-17, 2013, pp. 109-110.
Sammarco, Matteo, et al., "Trace Selection for Improved WLAN Monitoring," Aug. 16, 2013, pp. 9-14.
Shneiderman, Ben, et al., "Network Visualization by Semantic Substrates," Visualization and Computer Graphics, vol. 12, No. 5, pp. 733,740, Sep.-Oct. 2006.
Wang, Ru, et al., "Learning directed acyclic graphs via bootstarp aggregating," 2014, 47 pages, http://arxiv.org/abs/1406.2098.
Wang, Yongjun, et al., "A Network Gene-Based Framework for Detecting Advanced Persistent Threats," Nov. 2014, 7 pages.
Woodberg, Brad, "Snippet from Juniper SRX Series" Jun. 17, 2013, 1 page, O'Reilly Media, Inc.
Zhang, Yue, et al., "CANTINA: A Content-Based Approach to Detecting Phishing Web Sites," May 8-12, 2007, pp. 639-648.
Bauch, Petr, "Reader's Report of Master's Thesis, Analysis and Testing of Distributed NoSQL Datastore Riak," May 28, 2015, Brno. 2 pages.
Heckman, Sarah, et al., "On Establishing a Benchmark for Evaluating Static Analysis Alert Prioritization and Classification Techniques," IEEE, 2008; 10 pages.
Kim, Myung-Sup, et al. "A Flow-based Method for Abnormal Network Traffic Detection, " IEEE, 2004, pp. 599-612.
Thomas, R., "Bogon Dotted Decimal List," Version 7.0, Team Cymru NOC, Apr. 27, 2012, 5 pages.

\* cited by examiner

TECHNIQUES FOR DETERMINING NETWORK TOPOLOGIES

CROSS-REFERENCE TO RELATED APPLICATIONS

The present application claims priority to U.S. Provisional Patent Application Ser. No. 62/171,899, filed on Jun. 5, 2015, the content of which is herein incorporated by reference.

TECHNICAL FIELD

The present disclosure relates generally to communication systems, and more particularly, to techniques for determining network topologies of communication networks such as a data center network.

BACKGROUND

Increasingly, consumers and businesses alike turn to cloud-based services over local computing environments. Such cloud-based computing services advantageously provide access to customizable and scalable computing resources over a network (e.g., the Internet). Typically, cloud-based service providers house such computing resources in one or more data centers that may include hundreds or even thousands of devices such as servers, switches, processors, memory, and other corresponding hardware and software components. The sheer number of data center devices or nodes as well as the number of possible configurations often results in complex networks within each data center. Moreover, the devices forming such complex networks may dynamically change depending on customer needs. Accordingly, it is often difficult to identify node topologies, data path flow, and/or path characteristics for devices and/or networks within data center networks.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Overview

According to one or more embodiments of the disclosure, a monitoring device (or module) monitors messages exchanged between nodes in a communication network. The monitoring device further determines, based on time stamp data associated with each message, one or more latency distributions of paired response times between the nodes, and determines a node topology consistent with each of the one or more latency distributions of paired response times between the nodes. In some embodiments, the monitoring device also generates a graph of the node topology showing one or more communication links between the nodes, and annotates each communication link of the one or more communication links with at least one of a mean response time or a median response time based on at least one of the latency distributions.

Description

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

A communication network is a geographically distributed collection of nodes interconnected by communication links and segments for transporting data between end nodes, such as computers, workstations, servers, and the like. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology. Data centers, as mentioned above, can include complex networks of computing resources (e.g., mainframe computers, servers, application software, file and printer servers executing various operating systems, storage subsystems, network infrastructure, and the like) and provide network-based access to such computer resources.

Figure 1:
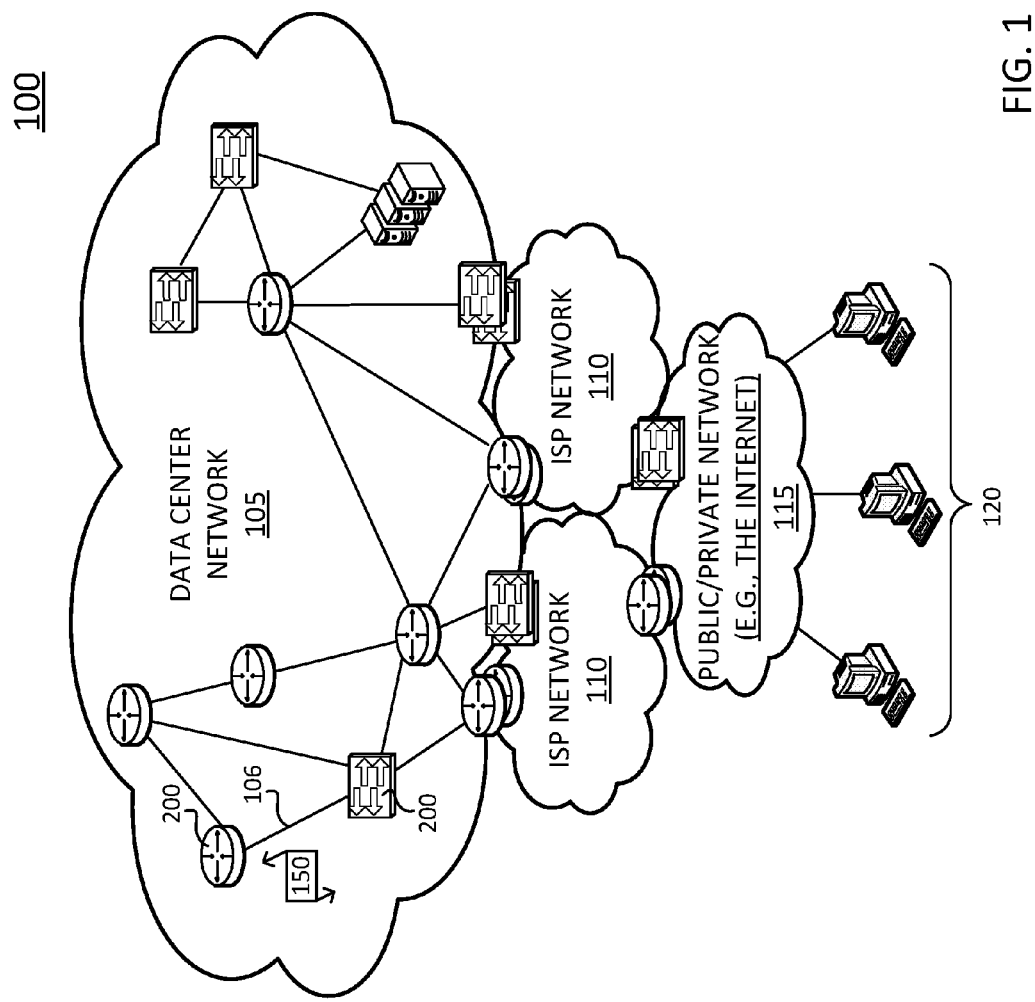
FIG. 1 illustrates a schematic diagram of an example communication network.

FIG. 1 illustrates a schematic diagram of an example communication network 100 illustratively comprising a data center network 105, one or more Internet Service Provider (ISP) network(s) 110, and a public/private network 115 (e.g., the Intent). Operatively, data center network 105 hosts computing resources (e.g., applications, services, storage, network infrastructure, and the like) and provides access to such computing resources to one or more client device(s) 120 over public/private network 115 and corresponding ISP network(s) 110

As shown, the various networks include nodes/devices that route requests and facilitate access to computing resources from data center network 105. For example, the nodes/devices shown in FIG. 1 may operate to direct data packets or messages from respective source nodes to a destination node. As shown, data center network 105 illustratively includes nodes/devices 200 (e.g., routers, sensors, servers, computers, etc.) interconnected by communication links 106. Communication links 105 may be wired links or shared media (e.g., wireless links, PLC links, etc.) where certain nodes/devices 200 may be in communication with other nodes/devices based on, for example, distance, signal strength, network topology, current operational status, location, etc. Further, certain nodes/devices 200 may be located near an "edge" of a network Data packets 150 (e.g., traffic and/or messages) may be exchanged among the nodes/devices 200 in communication network 100 using predefined network communication protocols such as certain known wired protocols (e.g., Interior Gateway Protocol (IGP), Exterior Border Gateway Protocol (E-BGP), TCP/IP, etc.), wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Those skilled in the art will understand that any number of nodes, devices, communication links, and the like may be used, and that the view shown herein is for simplicity. Also, those skilled in the art will further understand that while communication network 100 (including networks 105, 110, and 115) is shown in a certain orientation, such orientation is merely an example for purposes of illustration, not limitation.

Figure 2:
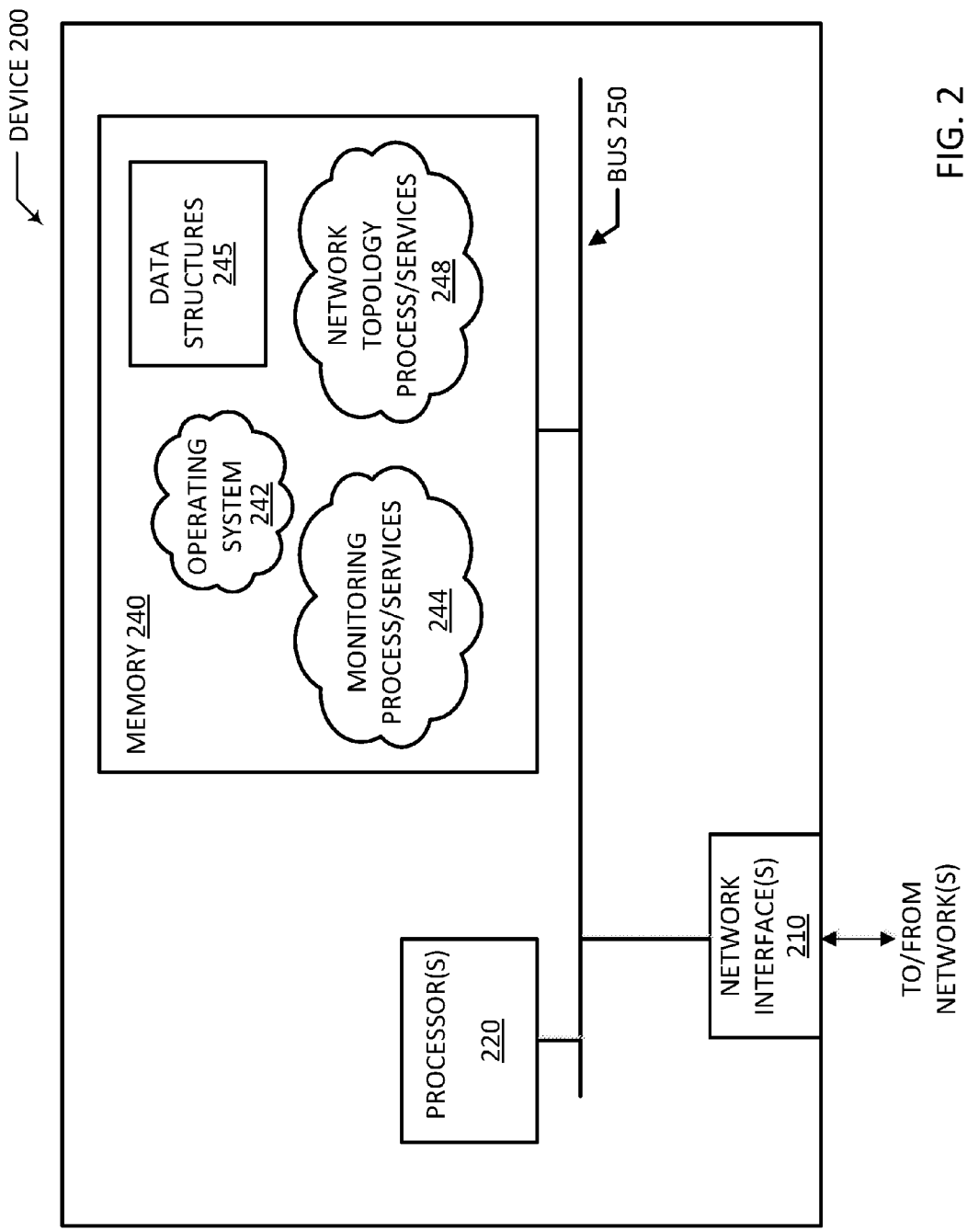
FIG. 2 illustrates a schematic diagram an example network device/node.

FIG. 2 is a schematic diagram of one example node/device 200 that may be used with one or more embodiments described herein, e.g., as one of the nodes/devices shown in FIG. 1 above. Device 200 may comprise one or more network interfaces 210 (e.g., wired, wireless, PLC, etc.), at least one processor 220, and a memory 240 interconnected by a system bus 250.

Network interface(s) 210 contain the mechanical, electrical, and signaling circuitry for communicating data over communication links 106 coupled to communication network 100. Network interfaces 210 may be configured to transmit and/or receive data using a variety of different communication protocols. Note, further, that one or more nodes/devices may include two different types of network interfaces 210, e.g., wireless and wired/physical connections, and that the view herein is merely for illustration.

Memory 240 comprises a plurality of storage locations that are addressable by the processor 220 and network interfaces 210 for storing software programs and data structures associated with the embodiments described herein. Note that certain devices may have limited memory or no memory (e.g., no memory for storage other than for programs/processes operating on the device and associated caches). Processor 220 may comprise hardware elements or hardware logic adapted to execute the software programs and manipulate the data structures 245. An operating system 242, portions of which may resident in memory 240 and executed by processor 220, functionally organizes the device by, inter alia, invoking operations in support of software processes and/or services executing on the device. These software processes and/or services may comprise monitoring process/services 244, and an illustrative network topology process 248, as described herein. Note that while processes/services 244 and 248 are shown in centralized memory 240, alternative embodiments provide for the process to be operated within network interfaces 210 (e.g., as a component of a MAC layer, etc.).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, data centers present unique challenges for understanding node topologies, data path flow, and/or path characteristics for devices and/or networks therein. Furthermore, providing customers on-demand cloud-based services creates a dynamic and ever changing environment, including possible frequent instantiations and de-instantiations of devices. Conventional approaches for determining network topologies often use round trip response times between nodes/devices to determine relative positions in a network topology. Notably, round trip time generally refers a total amount of time for a message or a packet to travel from a first node to a second node and then back to the first node. However, such round trip time may be inaccurate and affected by various factors such as network fluctuations, packet types, and the like. Accordingly, the techniques disclosed herein improve network mapping and generate network topologies based on, for example, statistical latency distributions (e.g., response times) for messages exchanged between nodes/devices in the network.

Notably, as used herein, the term "latency" or "latency value" generally refers to a response time for messages exchanged between nodes in a communication network; the term "packet" generally refers to messages or data exchanged between the nodes in a communication network; and the terms "paired" or "pair-wise" generally refers to a two-way exchange—e.g., one exchange representing packets sent from a first node and received by a second node, and another exchange representing packets sent from the second node and received by the first node.

According to the network monitoring and/or the network mapping technique disclosed herein, a monitoring device (or module) such as a switch, router, edge device, or other network device, determines communication latency or paired response times between nodes in a communication network from statistical latency distributions for all messages or packets exchanged between the nodes. More specifically, in some embodiments, the monitoring device determines communication latency for paired response times between nodes (e.g., from time stamp data associated with each message or packet exchanged between nodes). In certain embodiments, the monitoring device may be part of a distributed monitoring system, including a number of remote monitoring devices/nodes (e.g., located at edge switches in a network). These remote monitoring devices/nodes may be configured to time stamp messages or packets exchanged between the nodes in the network (e.g., on receipt, on transmission, etc.). Based on the time stamp data for each message, the monitoring device can determine latency distributions between pairs of nodes, and further determine representative latency values—e.g., mean latency, median latency, and the like. In some embodiments, outlier latency values or "bad" packet response times in a latency distribution may be eliminated or removed so as to avoid skewing the representative latency values (e.g., for initial network topology mapping). However, in other embodiments, these outlier latency values may be used to identify and troubleshoot network issues—e.g., according policies of the communication network and/or according to thresholds and/or deviations in a latency distribution. The network monitoring device further determines a node topology for the nodes in the communication network, consistent with the representative latency values, and generates a graph showing the node topology, including communication links annotated with corresponding representative latency values.

Illustratively, these techniques may be performed by hardware, software, and/or firmware, such as in accordance with the "monitoring" process 244 and/or "network topology" process 248, which may contain computer executable instructions executed by the processor 220 (or independent processor of interfaces 210) to perform certain functions.

Figure 3:
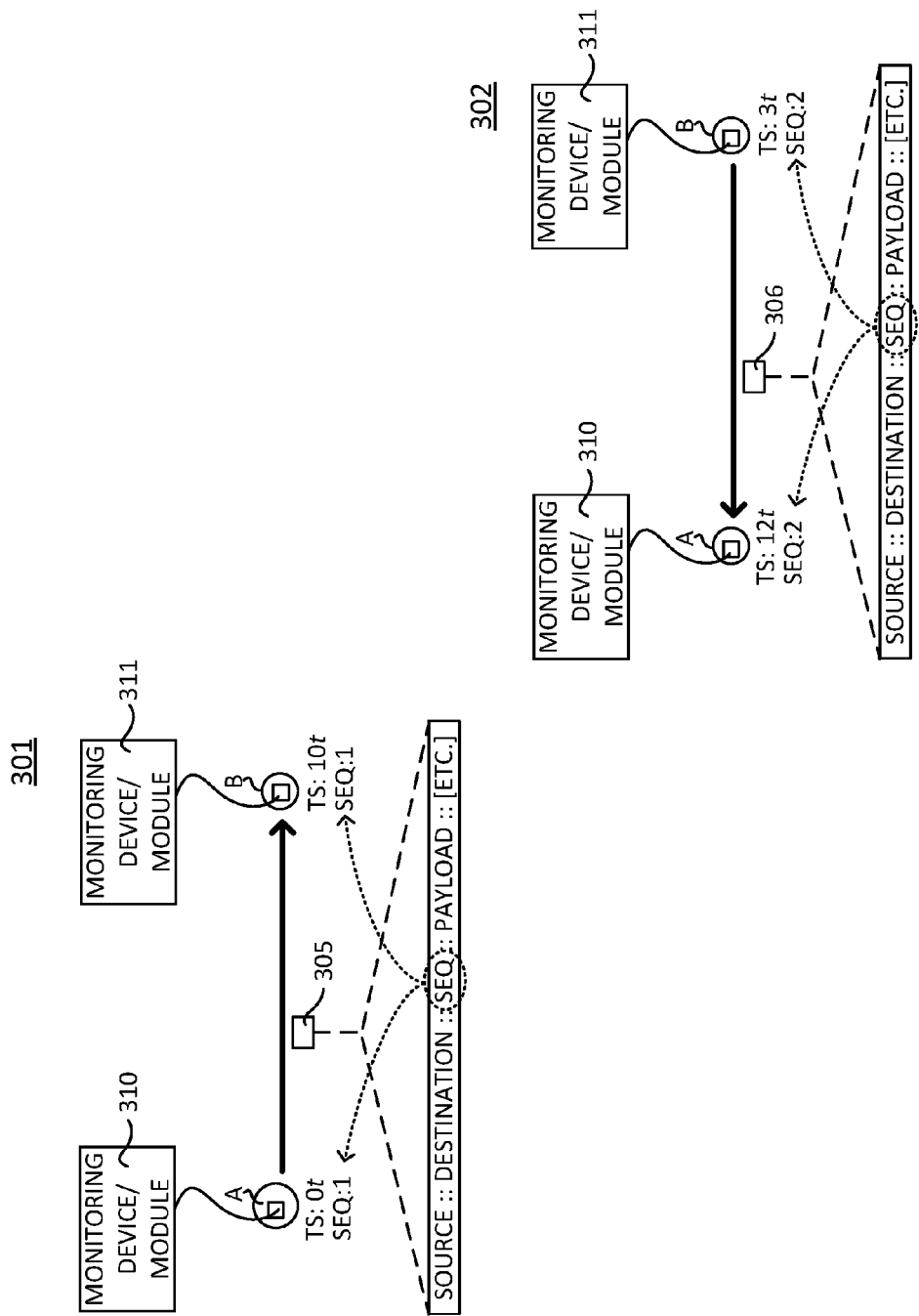
FIG. 3 illustrates schematic diagrams of a pair of nodes exchanging messages or packets.

FIG. 3 illustrates schematic diagrams of a pair of nodes exchanging messages or packets. For example, as shown, FIG. 3 includes a diagram 301 and a diagram 302 which collectively show messages exchanged between a node A and a node B. More specifically, diagram 301 shows a node A sending a packet 305 to a node B, and diagram 302 shows node B sending a packet 306 to node A. The exchange shown in diagram 301 and diagram 302 may be used to determine one or more paired latency values and/or paired latency distributions for communications between nodes—e.g., node A and node B.

As shown in FIG. 3, node A and node B are also configured to include respective monitoring modules 310 and 311. Notably, monitoring modules 310 and 311 may be part of a larger distributed monitoring device/system, and may send information related to packet tracking, time stamps, latency, and the like, to a remote module/device for further processing (or storage). In addition, monitoring modules 310 and 311 may be configured to execute one or more processes, such as monitoring process 244 and/or network topology process 248 (discussed above). It is appreciated that FIG. 3 and discussion herein are provided for purposes of exemplary embodiments, which are not to be limited to a particular protocol (e.g., transport layer protocol TCP, etc.).

Operatively, monitoring modules 310 and 311 in respective node A and node B time stamp "TS" packets on transmission and on reception. For example, in diagram 301, monitoring module 310 time stamps a packet 305 at 0t when node A sends packet 305 to node B. Similarly, monitoring module 311 time stamps packet 305 on reception by node B at 10t. With respect to tracking the time stamps and time stamp data for an exchange between nodes—here, TS=0t and TS=10t—monitoring modules 310 and/or 311 operably associate and/or assign respective time stamps with/to packet 305 based on one or more unique message identifiers. For example, unique message identifiers can include a sequence number (SEQ: 1) (shown in FIG. 3), a packet header, packet type, packet size, payload data, a byte size data, acknowledge (ACK) data or identifier, and the like. In this fashion, monitoring module 310 and/or monitoring module 311 determine a response time or latency value for packet 305 by comparing time stamps associated with packet 305 and determining a time difference there-between—e.g., a time difference between 0t and 10t yields a total latency value of 10t.

In some embodiments, monitoring modules 310 and/or 311 (or a remote monitoring device) employ statistical algorithms to classify each packet according to a particular attribute (e.g., a packet type) and determine attribute specific latency values. In this manner, latency and latency distributions between nodes can be determined with granularity (e.g., specific to packet attributes, etc.)

In diagram 302, monitoring module 311 time stamps packet 306 at 3t, and sends packet 306 to node A. Monitoring module 310 time stamps packet 306 on reception by node A at 12t. As shown in diagram 302, monitoring modules 310 and 311 associate or assign respective time stamps for packet 306 with a sequence number—SEQ: 2. As with diagram 301 (discussed above), a latency value or response time for packet 306 may be determined by a comparing respective time stamps associated with packet 306—e.g., a time difference between 3t and 12t yields a total latency value of 9t.

Packets 305 and 306 are tracked by monitoring modules 310 and 311 and associated with a paired latency value or paired response time for communications between node A and node B. Specifically, time stamps associated with each packet are analyzed to determine paired latency values. Further, these paired latency values may be analyzed according to a latency distribution graph. For example, one or more statistical algorithms may be employed to generate a latency distribution, and representative latency values may be derived from such latency distribution. For example, some representative latency values include an average or median latency or response time between node A and node B. Further, as mentioned, an average or median latency can be determined from all packets exchanged between pairs of nodes, and/or according to certain packet attributes.

Although FIG. 3 illustrates multiple monitoring modules—here, monitoring module 310 and 311—it is appreciated that a single monitoring module or device may be employed (e.g., monitoring traffic on the communication link between node A and node B, and/or any additional number of monitoring modules or devices may be used as appropriate. Further, although FIG. 3 illustrates a direct communication link between node A and node B, it is appreciated that any number of nodes or hops may be present and that the view shown herein in for purposes of illustration, not limitation.

Figure 4:
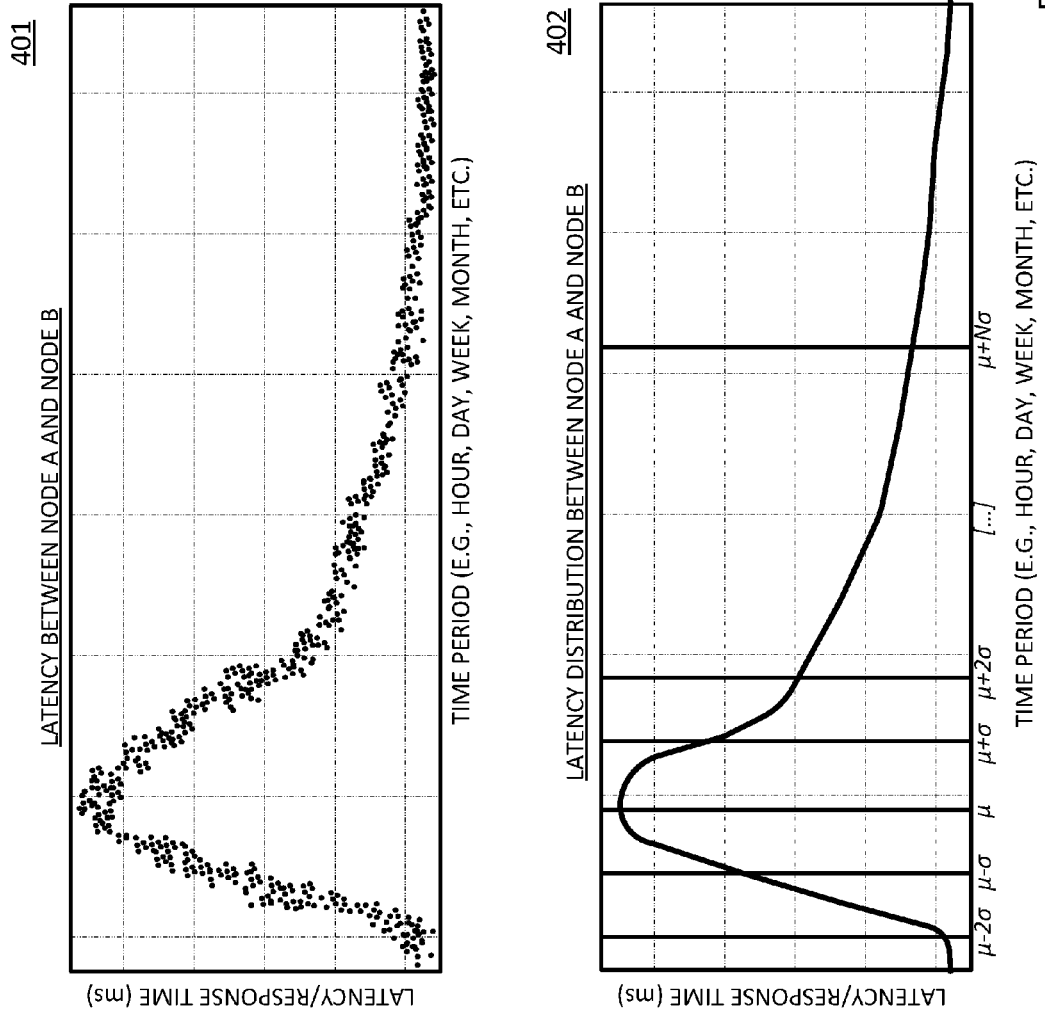
FIG. 4 illustrates graphs showing latency values or response times for messages exchanged between the pair of nodes shown in FIG. 3.

FIG. 4 illustrates two graphs, here 401 and 402, showing latency values (or response times) (ms) for messages exchanged between node A and node B over a time period (e.g., an hour, a day, a week, a month, etc.). More specifically, graph 401 illustrates raw data points corresponding to a paired response time for packets exchanged between node A and node B. Graph 402 illustrates a statistical distribution or a latency distribution of the raw paired response times. Notably, as is appreciated by those skilled in the art, a time period shown in graph 402 may represent the same time period shown in graph 401, or it may only represent only a portion thereof. Further, as shown in graph 402, the raw paired response times over the time period conform to a log-normal distribution. Further, as shown in graph 402, the latency distribution includes a center line ($\mu$) having one or more standards of deviation ($\mu+/-\sigma$, $\mu+/-2\sigma$, etc.) spaced apart on both sides. In some embodiments, the center line ($\mu$) may represent latency values corresponding to a mean response time, a median response time, and the like. It is further appreciated that various other distribution curves or other distribution analysis may be used as appropriate (e.g., mean lines, bell-curve distributions, and the like).

In addition, as mentioned above, the latency distribution shown in graph 402 may also indicate one or more outlier latency values, which can be determined according to policies of the communication network and/or according to pre-determined thresholds. For example, certain outlier latency values may result from dropped packets, internal device buffering, or other network conditions not relevant to an initial network topology mapping. Accordingly, in some embodiments, these outlier latency values may be eliminated from an initial latency analysis or calculation since the outlier latency values may improperly skew representative latency value determinations. Notably, however, these outlier latency values may be important for subsequent network analysis and/or network troubleshooting. For example, these outlier latency values may indicate communications issues amongst nodes—e.g., when a measured response time is (statistically) greater than a median response time, a mean response time, and the like. Moreover, the latency distribution shown in graph 402, including the representative latency value (μ), may be used to annotate paired latency values for communication links between nodes, as shown in FIGS. 5-8.

Figure 5:
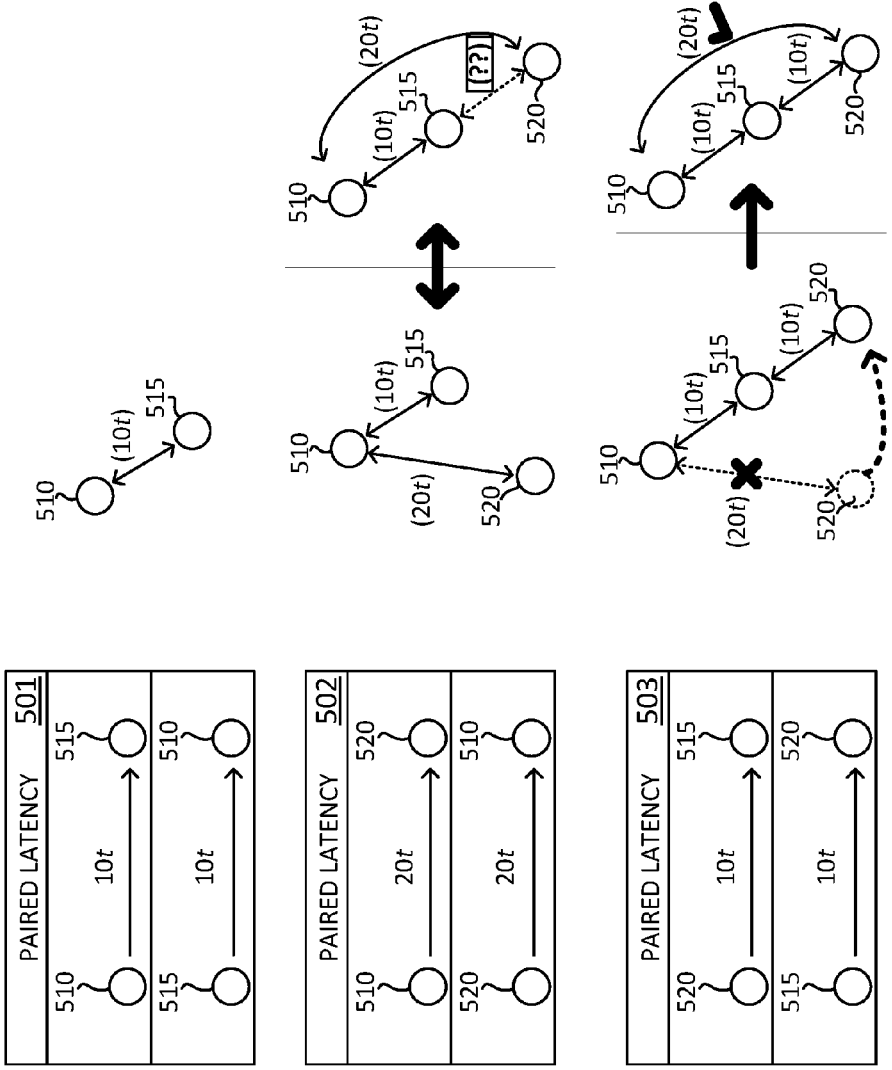
FIG. 5 illustrates latency charts showing paired latency values or response times for messages exchanged between nodes in a communication network.

In particular, FIG. 5 illustrates latency charts 501, 502, and 503, showing paired latency values for messages or packets exchanged between nodes 510, 515, and 520. Preferably, these paired latency values are determined from latency distributions, as discussed above (e.g., Nt+/−σ, etc.). As shown, latency chart 501 indicates a paired latency value between node 510 and 515 at 10t, latency chart 502 indicates a paired latency value between nodes 510 and 520 at 20t, and latency chart 503 indicates a paired latency value between nodes 520 and 515 at 10t.

Next to each latency chart, potential network topologies are shown. The potential network topologies represent possible network configurations, with certain communication links marked with an "x" to represent an inconsistency with the paired latency values shown in latency charts 501, 502, and 503 and/or an inconsistency with a threshold tolerance. For example, a network topology conforming to latency chart 501 includes a communication link or connection between node 510 and node 515, having an annotated latency value of 10t. However, multiple network topologies potentially conform to paired latency chart 502 (and remain consistent with latency chart 501). Here, one potential network topology includes a direct communication link or connection between node 510 and node 520 (with an annotated latency value of 20t), and another potential network topology includes node 515 disposed between node 510 and node 520, including corresponding communication links. Notably, the potential network topology including node 515 disposed between node 510 and node 520 includes an unknown latency value (marked as "??") for the communication link between node 515 and node 520. Further latency information from latency chart 503 resolves the unknown latency value. Alternatively, or in addition, latency distribution information may also resolve ambiguity between multiple potential network topologies. For example, referring to the topology shown next to latency chart 503, assume a latency of 20t for direct communications between node 510 and node 520 represents an outlier latency value and/or a latency value outside a threshold tolerance. In this example, the direct communication link between node 510 and node 520 is marked with an X since the latency value of 20t is an outlier/outside tolerance. Further, the remaining latency value shown in latency chart 503 provides the previously unknown latency value as 10t, which validates the network topology having node 515 disposed between node 510 and node 520. Thus, the network topology consistent with the latency charts 501, 502, and 503, and latency distribution information (e.g., excluding outliers and/or response times outside of thresholds, etc.), includes node 515 disposed between nodes 510 and 520, with communication links there-between.

Figure 6:
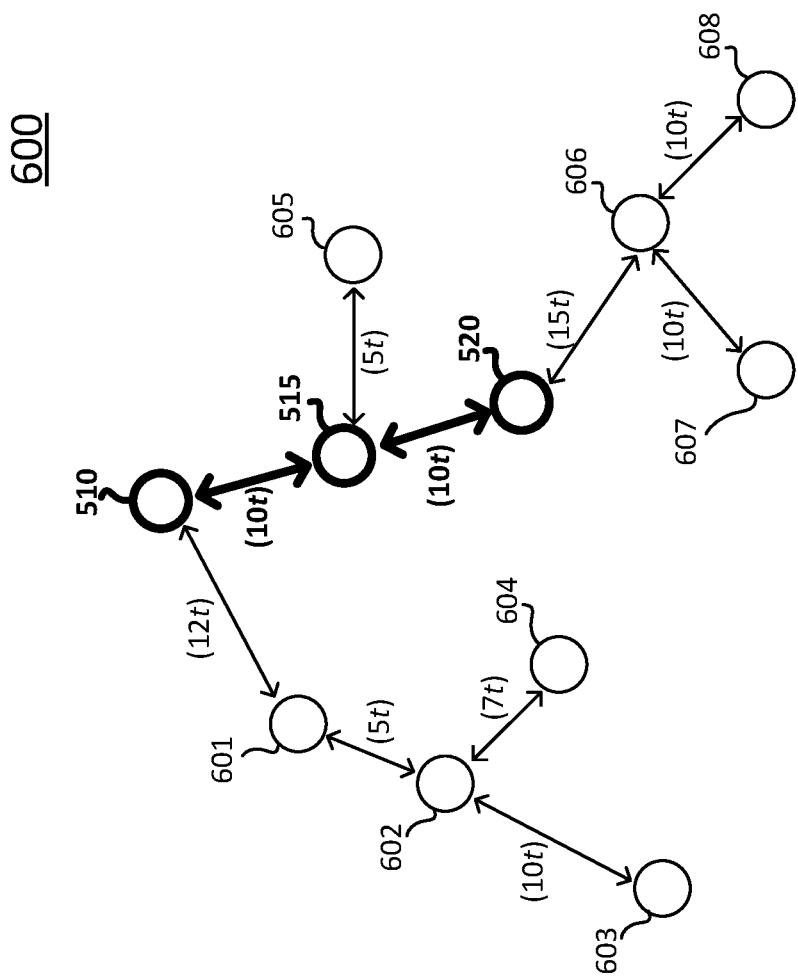
FIG. 6 illustrates a network topology, including a network topology for the nodes shown in FIG. 5.

FIG. 6 illustrates a network topology 600, showing the node topology for nodes 510, 515, and 520, as well as a larger node topology for other nodes in the communication network. In particular, network topology 600 is derived from paired latency charts such as those shown in FIG. 5, as well as an analysis of latency distributions for communications between each of the nodes. Preferably, node topology 600 shows annotated communication links between representing latency values or response times for packets exchanged between the nodes. These latency values, as discussed above, may represent an average or median latency value for all packets exchanged between two corresponding nodes, and/or for packets having particular attributes.

Figure 7:
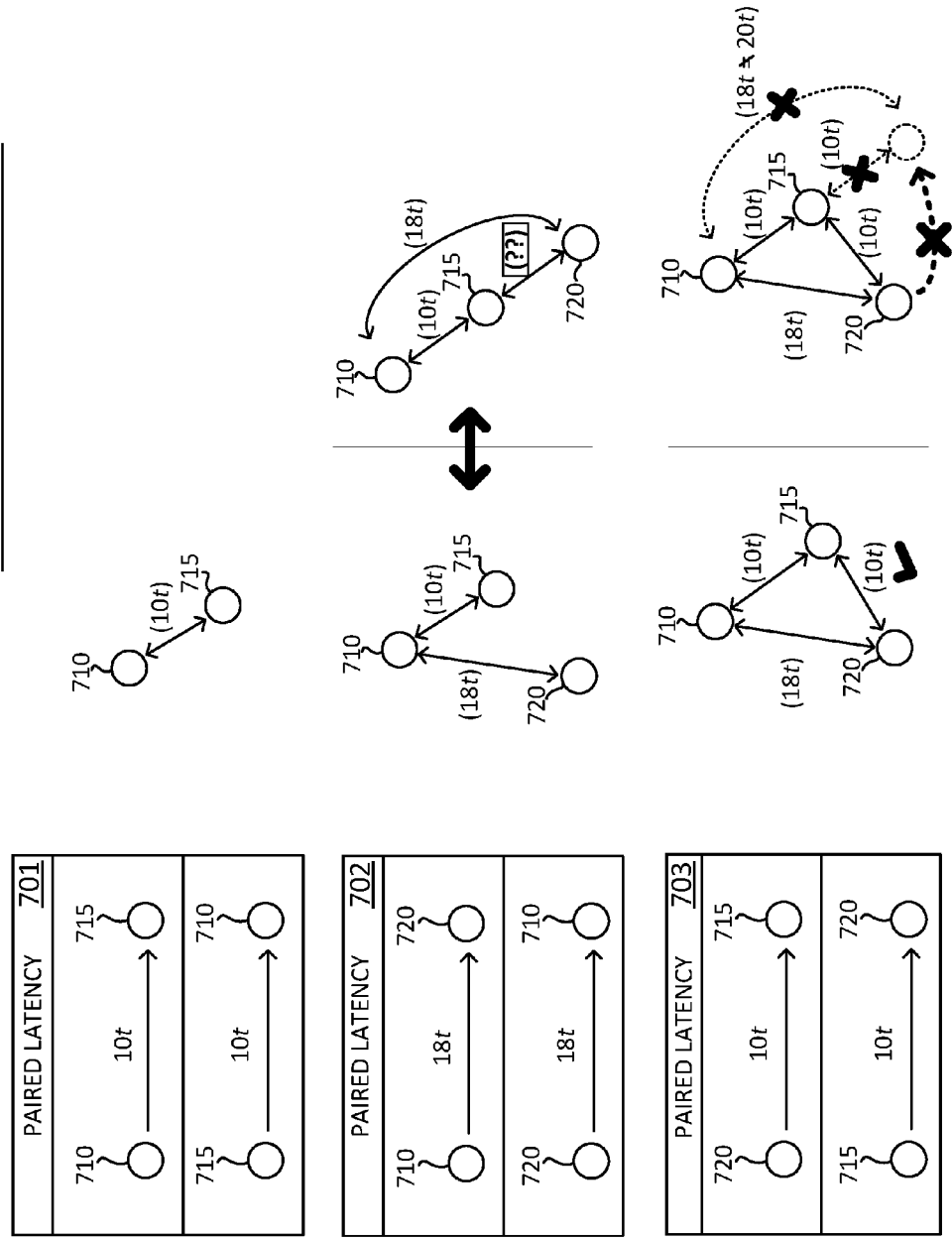
FIG. 7 illustrates latency charts showing paired latency values or response times for messages exchanged between nodes in a communication network.

FIG. 7 also illustrates exemplary latency charts similar to those shown in FIG. 5. Here, FIG. 7 includes latency charts 701, 702, and 703, showing paired latency values for packets exchanged between nodes 710, 715, and 720. In particular, latency chart 701 shows a paired latency value between node 710 and 715 at 10t, latency chart 702 shows a paired latency value between nodes 710 and 720 at 18t, and latency chart 703 shows a paired latency value between nodes 720 and 715 at 10t. As discussed above, the paired latency values in paired latency charts 701, 702, and 703 may be determined from latency distributions (e.g., Nt+/−σ, etc.) of response times for messages exchanged between the nodes. Further, similar to FIG. 5, FIG. 7 provides potential network topologies next to respective latency charts.

As shown, a network topology conforming to latency chart 701 includes a communication link between node 710 and node 715, having an annotated latency value of 10t. Multiple network topologies are possible consistent with latency chart 702 (and consistent with latency chart 701). As shown, one potential network topology includes a direct link or direct connection between node 710 and node 720, having an annotated latency value of 18t, and another potential network topology includes node 715 disposed between node 710 and node 720, having an unknown latency value "??" for the communication link connecting node 715 and node 720.

Additional latency distribution information and/or additional latency values (e.g., latency chart 703) may resolve ambiguity between the potential network topologies. Specifically, latency chart 703 indicates a latency value for communications between nodes 715 and 720 at 10t, which invalidates the network topology having node 715 disposed between nodes 710 and 720. Put differently, the node topology having node 715 disposed between nodes 710 and 720 results in a total latency value of 20t from an aggregation of (10t) between 710-715 and (10t) between 715 and 720, while the latency value between nodes 710 and 720 is only 18t. In this fashion, the network topology, showing node 715 disposed between node 710 and 720, is in consistent with the latency values shown in latency chart 703. Thus, the network topology consistent with the latency charts 701, 702, and 703, includes a direct communication link between node 710 and node 720, a direct communication link between node 720 and node 715, and a direct communication link between node 715 and node 710. Notably, in this example, the additional latency distribution information such as indications of outlier response times, thresholds, and the like, was not employed to determine the appropriate network topology.

Figure 8:
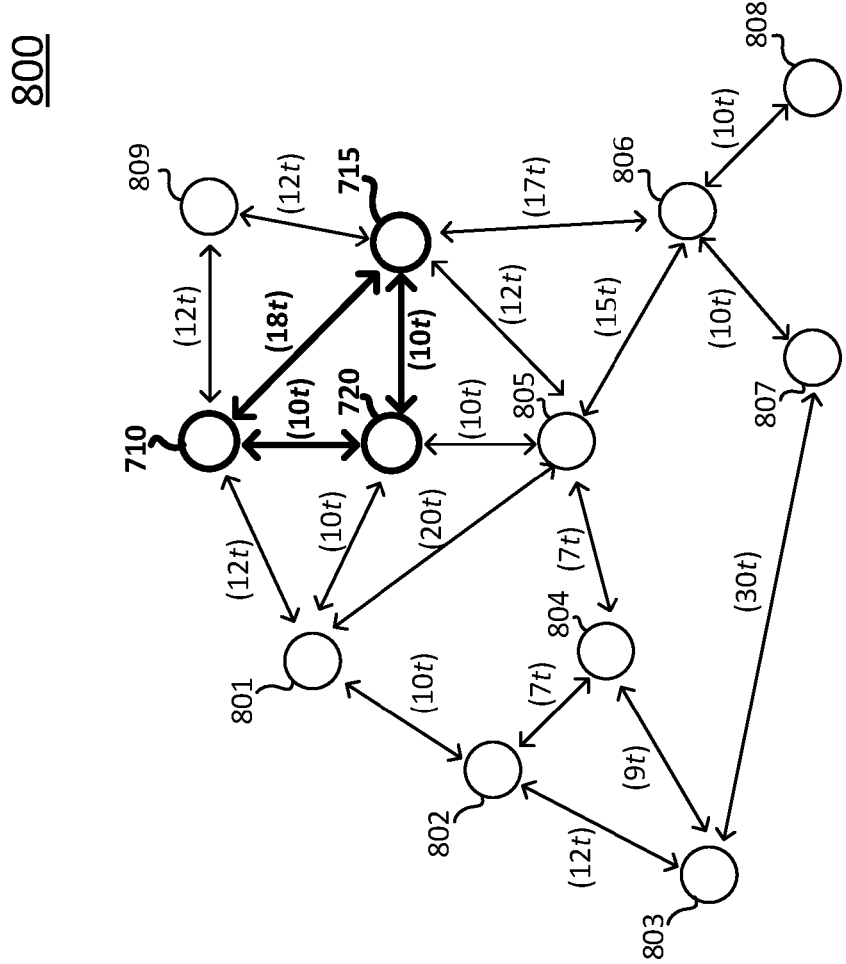
FIG. 8 illustrates a network topology, including a network topology for the nodes shown in FIG. 7.

FIG. 8 illustrates a network topology 800, showing the node topology for nodes 710, 715, and 720, as well as a broader node topology of other nodes in the communication network. Network topology 800 is preferably derived, in part, from paired latency values (e.g., latency charts 701, 702, 703), and/or from an analysis of latency distributions for communications between the nodes. As shown, node topology 800 includes annotated communication links representing latency values or response times between the nodes. The latency values, as discussed above, may represent an average or median response time for all packets exchanged between two corresponding nodes, and/or, in some embodiments, the latency values may represent response times for certain types of packets.

FIGS. 5-8 collectively illustrate example node topologies determined from latency distributions, tolerances, thresholds, and the like. The example node topologies shown in FIGS. 5-8, including the illustrated orientations, latency values, and the like, are provided for purposes of discussion, not limitation. It is appreciated that various types of node topologies, orientations, latency values, and the like, may be used as appropriate.

Figure 9:
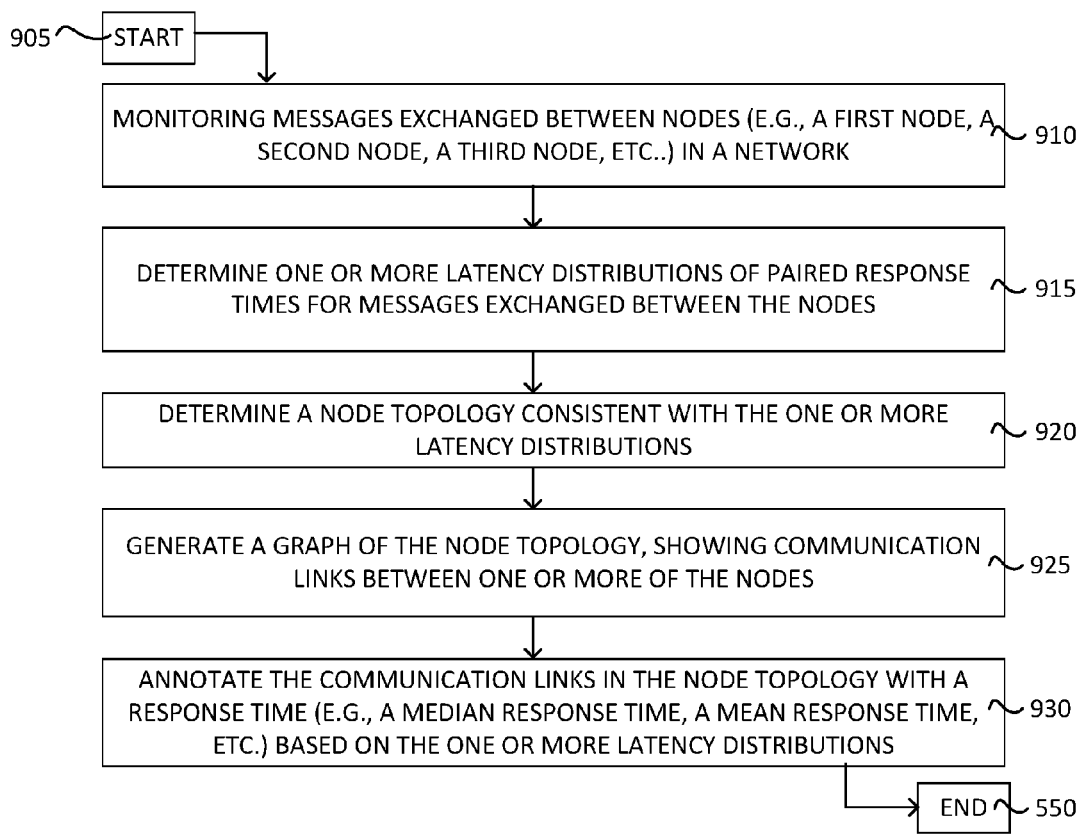
FIG. 9 illustrates an example simplified procedure for mapping a network topology in a communication network.

FIG. 9 illustrates an example simplified procedure 900 for mapping network topologies in a communication network (e.g., a data center network), in accordance with one or more embodiments described herein. As shown, procedure 900 is shown from the view of a monitoring node/device in the data center (e.g., a switch, a hypervisor, a router, a virtual machine, etc.).

Procedure 900 begins at step 905 and continues to step 910, where, as described in greater detail above, the monitoring device (or node) monitors messages or packets exchanged between nodes in a communication network (e.g., a data center network). For purposes of discussion, the monitoring device particularly monitors messages exchanged between, for example, a first node, a second node, and a third node.

Procedure 900 continues to step 915, where the monitoring device determines one or more latency distributions for paired response times corresponding to the messages exchanged between the nodes. For example, the one or more latency distributions can include a first latency distribution corresponding to response times between the first node and the second node, a second latency distribution corresponding to response times between the first node and the third node, and a third latency distribution corresponding to response times between the second node and the third node.

The monitoring device also determines, at step 920, a node topology consistent with the one or more latency distributions—here, the first latency distribution, the second latency distribution, and the third latency distribution—and generates, at step 925, a graph of a node topology showing one or more communication links between the nodes.

With respect to determining the node topology, in some embodiments, the monitoring device may compare, aggregate, or otherwise analyze the latency distributions to determine relative positions for each node in the communication network. Further, as discussed above, the latency distributions may be refined according to tolerances and/or thresholds to eliminate certain response times (e.g., outliers, outside thresholds, etc.), which certain response times may improperly skew initial node topology mapping (e.g., skew median/mean lines in the corresponding latency distributions).

Preferably, the monitoring device annotates, at step 930, each communication link with a representative response time or latency value. For example, the representative response time may include a mean response time, a median response time, or other measures of a response time from the corresponding latency distribution.

It should be noted that while certain steps within procedure 900 may be optional, and further, the steps shown in FIG. 9 are merely examples for illustration—certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for monitoring and mapping network topologies in a communication network (e.g., a data center network) based on statistical analysis of response times or latency between pairs of nodes. The techniques described herein provide simple solutions to determine latency based on time stamped values, which can be assigned by network devices such as an edge switch, router, and the like.

While there have been shown and described illustrative embodiments to determine latency distributions amongst pairs of network nodes, network topology mapping, and the like, it is to be understood that various other adaptations and modifications may be made within the spirit and scope of the embodiments herein. For example, the embodiments have been shown and described herein using response times in factors of a generic time (t), however it is appreciated that latency or response times may be measured in specific fractions, or portions of seconds (e.g., milliseconds, microseconds, etc.) or other appropriate measures of time.

The foregoing description has been directed to specific embodiments. It will be apparent; however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method, comprising:
monitoring, by a monitoring device in a communication network, messages exchanged between at least a first node, a second node, and a third node;
determining, based on time stamp data associated with each message, one or more latency distributions of paired response times between the first node, the second node, and the third node, the one or more latency distributions include at least a first latency distribution corresponding to response times between the first node and the second node, a second latency distribution corresponding to response times between the first node and the third node, and a third latency distribution corresponding to response times between the second node and the third node;
determining a node topology consistent with the first latency distribution, the second latency distribution, and the third latency distribution;
generating a graph of the node topology showing one or more communication links between one or more of the first node, the second node, or the third node; and
annotating each communication link of the one or more communication links with at least one of a mean response time or a median response time based on at least one of the first latency distribution, the second latency distribution, or the third latency distribution.

2. The method of claim 1, wherein determining the node topology further comprises:
comparing an aggregated latency distribution of the first latency distribution and the second latency distribution to the third latency distribution to determine a position in the node topology for each of the first node, the second node, and the third node.

3. The method of claim 2, further comprising:
determining the second node is disposed between the first node and the second node in the node topology when the aggregated latency distribution substantially matches the third latency distribution.

4. The method of claim 1, wherein the monitoring device includes a plurality of distributed monitoring modules operable by one or more of the first node, the second node, and the third node.

5. The method of claim 4, further comprising:
receiving, by the monitoring device, the time stamp data associated with each message from the plurality of monitoring modules.

6. The method of claim 1, further comprising:
determine, by the monitoring device, the time stamp data associated with each message based on a unique message identifier, and
wherein, determining the one or more latency distributions, further comprises determining, based on the time stamp data associated with each message and the unique identifier associated with each message, the one or more latency distributions of paired response times for the messages exchanged between the first node, the second node, and the third node.

7. The method of claim 6, wherein the unique message identifier includes at least one of a packet header, a sequence number, an acknowledgement number, a type, or a size of the message.

8. The method of claim 1, wherein the first latency distribution represents a first paired response time distribution for the messages exchanged between the first node and the second node, the second latency distribution represents a second paired response time distribution for the messages exchanged between the first node and the third node, and the third latency distribution represents a third paired response time distribution for the messages exchanged between the second node and the third node.

9. The method of claim 1, further comprising:
determining at least one of the average response time or the median response time for each latency distribution, including the first latency distribution, the second latency distribution, and the third latency distribution, and
wherein, determining the node topology further comprises determining the node topology consistent with the at least one of the average response time or the median response time for each latency distribution.

10. The method of claim 1, wherein determining the node topology, further comprises:
identifying one or more outlier response times in each latency distribution, including the first latency distribution, the second latency distribution, and the third latency distribution;
removing the one or more outlier response times from each latency distribution; and
generating the at least one of the median response time or the mean response time for each latency distribution after removing the one or more outlier response times.

11. The method of claim 1, wherein at least one of the first node, the second node, or the third node includes one of a virtual machine, a hypervisor, a switch, or a router.

12. A monitoring device, comprising:
one or more network interfaces to communicate within a communication network;
a processor coupled to the network interfaces and adapted to execute one or more processes; and
a memory configured to store a process executable by the processor, the process when executed operable to:
monitor messages exchanged in the communication network between at least a first node, a second node, and a third node;
determine, based on time stamp data associated with each message, one or more latency distributions of paired response times between the first node, the second node, and the third node, the one or more latency distributions include at least a first latency distribution corresponding to response times between the first node and the second node, a second latency distribution corresponding to response times between the first node and the third node, and a third latency distribution corresponding to response times between the second node and the third node;
determine a node topology consistent with the first latency distribution, the second latency distribution, and the third latency distribution;
generate a graph of the node topology showing one or more communication links between one or more of the first node, the second node, or the third node; and
annotate each communication link of the one or more communication links with at least one of a mean response time or a median response time based on at least one of the first latency distribution, the second latency distribution, or the third latency distribution.

13. The monitoring device of claim 12, wherein the process, when executed to determine the node topology, is further operable to:
compare an aggregated latency distribution of the first latency distribution and the second latency distribution to the third latency distribution to determine a position in the node topology for each of the first node, the second node, and the third node.

14. The monitoring device of claim 13, wherein the process, when executed, is further operable to:
determine the second node is disposed between the first node and the second node in the node topology when the aggregated latency distribution substantially matches the third latency distribution.

15. The monitoring device of claim 12, further comprising:
a plurality of distributed monitoring modules operable by one or more of the first node, the second node, and the third node, and
wherein, the process, when executed, is further operable to receive the time stamp data associated with each message from the plurality of monitoring modules.

16. The monitoring device of claim 12, wherein the process, when executed, is further operable to:
determine the time stamp data associated with each message based on a unique message identifier, and
wherein, the process to determine the one or more latency distributions, when executed, is further operable to determine, based on the time stamp data associated with each message and the unique identifier associated with each message, the one or more latency distributions of paired response times for the messages exchanged between the first node, the second node, and the third node.

17. The monitoring device of claim 16, wherein the unique message identifier includes at least one of a packet header, a sequence number, an acknowledgement number, a type, or a size of the message.

18. The monitoring device of claim 12, wherein the process, when executed, is further operable to:
determine at least one of the average response time or the median response time for each latency distribution, including the first latency distribution, the second latency distribution, and the third latency distribution, and wherein, the process to determine the node topology, when executed, is further operable to determine the node topology consistent with at least one of the average response time or the median response time for each latency distribution.

19. The monitoring device of claim 12, wherein the process to determine the node topology, when executed, is further operable to:
identify one or more outlier response times in each latency distribution, including the first latency distribution, the second latency distribution, and the third latency distribution;
remove the one or more outlier response times from each latency distribution; and
generate the at least one of the median response time or the mean response time for each latency distribution after removing the one or more outlier response times.

20. A tangible, non-transitory, computer-readable media having software encoded thereon, the software, when executed by a processor, operable to:
monitor messages exchanged in the communication network between at least a first node, a second node, and a third node;
determine, based on time stamp data associated with each message, one or more latency distributions of response times between the first node, the second node, and the third node based on time stamp data associated with each message, the one or more latency distributions include at least a first latency distribution corresponding to response times between the first node and the second node, a second latency distribution corresponding to response times between the first node and the third node, and a third latency distribution corresponding to response times between the second node and the third node;
determine a node topology consistent with the first latency distribution, the second latency distribution, and the third latency distribution;
generate a graph of the node topology showing one or more communication links between one or more of the first node, the second node, or the third node; and
annotate each communication link of the one or more communication links with at least one of a mean response time or a median response time based on at least one of the first latency distribution, the second latency distribution, or the third latency distribution.

* * * * *